United States Patent [19]

Maiocchi et al.

[11] Patent Number: 5,793,180

[45] Date of Patent: Aug. 11, 1998

[54] FULLY DIGITAL DRIVE SYSTEM FOR BRUSHLESS MOTOR WITH VOLTAGE OR CURRENT PROFILES READ FROM A DIGITAL MEMORY

[75] Inventors: Giuseppe Maiocchi, Villa Guardia; Marco Viti, Sesto S. Giovanni, both of Italy

[73] Assignee: SGS-Thomson Microelectronics S.r.l., Agrate Brianza, Italy

[21] Appl. No.: 858,255

[22] Filed: May 19, 1997

[30] Foreign Application Priority Data

May 22, 1996 [EP] European Pat. Off. ............... 96830295

[51] Int. Cl.$^6$ ............................................. H02P 1/26
[52] U.S. Cl. ............... 318/778; 318/254; 318/138; 318/439; 318/798; 318/815; 318/560; 318/567; 318/569; 388/904
[58] Field of Search ................. 318/254, 138, 318/439, 798–815, 560, 567, 569, 778; 388/904, 804, 811, 819

[56] References Cited

U.S. PATENT DOCUMENTS

| | | | |
|---|---|---|---|
| 4,409,534 | 10/1983 | Bose | 318/811 |
| 4,634,952 | 1/1987 | Yoshino et al. | 318/811 |
| 5,272,424 | 12/1993 | Lee | 318/560 |
| 5,592,058 | 1/1997 | Archer et al. | 318/254 |

FOREIGN PATENT DOCUMENTS 0324396  1/1989  European Pat. Off. .......... H02P 6/02

*Primary Examiner*—Karen Masih
*Attorney, Agent, or Firm*—Allen, Dyer, Doppelt, Milbrath & Gilchrist, P.A.

[57] ABSTRACT

Pre-defined driving profiles for the distinct phase-windings of an electronically controlled brushless motor are continuously reconstructed for each switching phase and forced in the form of a drive current or voltage on the respective windings, in synchronism with a signal indicative of the rotor position, from just a first complete sequence and at least a first sample of the successive sequence of a number of sequences, each of N samples, equal to the number of switching phases of the motor, in which is divided a complete digitized pre-defined profile. The digital samples are stored in a nonvolatile memory and that are scanned at a continuously regulated clock frequency and with varying order and direction of scanning for reconstructing the instantaneous driving profiles for all the windings.

16 Claims, 11 Drawing Sheets

BRUSHLESS CONFIGURATION WINDINGS
AND CONSTANT PROFILE CURRENTS

TRANSCONDUCTANCE AND CONTROL FOR
CONSTANT PROFILE CURRENT LOOP

CURRENT PROFILE MEMORIZED IN STATIC RAM
THE PROFILE IS DIVIDED INTO 6 SEQUENCES
OF N SAMPLES EACH

In bold is the voltage/current profile memorized into digital memory composed by N+1/2N samples.
X is the number of bits used to digitize each sample of the profile.

block schematic of the invented system

RESET CONDITIONS
AND ZONES ADDRESSING
SIGNALS

BLOCK SCHEMATIC OF THE CONVx BLOCKS
CONVERT A X+1 BITS SAMPLE IN A PWM SIGNAL
X+1-8 IN FIGURE block schematic of the derived system block schematic of the 60 degrees system

FULLY DIGITAL DRIVE SYSTEM FOR BRUSHLESS MOTOR WITH VOLTAGE OR CURRENT PROFILES READ FROM A DIGITAL MEMORY

FIELD OF THE INVENTION

The present invention relates to driving techniques for an electronically switched DC motor, commonly referred to as "brushless".

BACKGROUND OF THE INVENTION

According to a novel driving technique, described and illustrated in the European Patent application No. 96830180.4, filed on Mar. 29, 1996 in the name of the same assignee and which content is herein incorporated by way of reference, through the motor's phase windings are forced excitation currents (or voltages) which, rather than having a certain pre-established and substantially constant level during each switching phase, they possess a certain profile (not of a constant value) that may be preventively defined, digitized and stored in a nonvolatile static memory such as an EPROM or an EEPROM. The pre-defined profile (obviously cyclic or alternating) may be a sinusoid or more generally the resulting waveform of a sum of Fourier harmonics of a fundamental frequency.

In practice, this novel driving technique allows for the optimization of the torque characteristics of the motor, allowing for the pre-definition of a more adequate cyclic form of the excitation current or of the voltage to be forced or applied on the phase windings of the motor. The current (or the voltage) forced during each switching phase does not correspond to a certain constant value as is the usual case in known driving systems, but rather to a certain profile congruent with the whole pre-defined cyclic or alternating waveform.

A second European Patent application No. 96830190.3, filed on Apr. 24, 1996, in the name of the same assignee, the content of which is also herein incorporated by way of reference, discloses a particularly suited synchronization technique of the different excitation phases in respect to the real rotor's position to optimize the torque characteristic, in relation to a driving system as that illustrated in the previously cited patent application No. 9683010.4.

The driving system described in the above-identified patent applications envisages the storage in different buffers of the driving current or voltage profiles for the different motor's windings. This entails a certain costly requirement of nonvolatile memory capacity.

SUMMARY OF THE INVENTION

The present invention aims to reduce this requirement by providing for reconstruction logic circuitry of current or the voltage profiles of phase excitation for the corresponding motor's windings during all the switching phases, to allow for permanently storing in a nonvolatile manner only a significant part of an entire excitation profile (waveform) of a motor's phase winding.

This important result is obtained by assuming (as in the above mentioned prior patent applications) the subdivision in a given number of sequences, each of N samples, and equal in number to the motor's switching phases, of a whole driving profile. According to a first embodiment, the system of the invention allows storing substantially only one quarter of a whole current or voltage profile of phase excitation and to reconstruct every time the remaining three quarters of the whole periodic profile for all the motor's windings.

According to this first embodiment, in the case of a motor having three phase windings connected in a star configuration and defining six different switching phases, the system permanently stores in a nonvolatile memory a first whole sequence of N samples of the six sequences into which is subdivided an entire cycle or profile for 360 electric degrees and only half of the N samples of the successive sequence, in practice a total number of samples equal to N+1/2N. As a whole these digitized and stored samples correspond to a quarter of the entire periodic driving profile of a phase winding, typically having an almost sinusoidal form or being the result of a sum of harmonics. The system of the invention reconstructs the entire driving profile for each of the phase windings of the motor by repeatedly scanning (reading) the permanently stored samples of the whole sequence of N samples and of the half-sequence of 1/2N samples in different directions and combinations, while modulating their amplitude as a function of an updated coefficient calculated by a dedicated control routine of the motor's speed.

In accordance with an alternative embodiment of the invention, it is possible to further reduce the nonvolatile memory requisite by storing just the N samples of the first sequence and only the first sample of the following sequence, that is, one sample more than the N samples that pertain to just 60 electric degrees of an entire excitation profile or waveform of 360 electric degrees, as will be shown in details further on in this description. Another important aspect of the invention is that the entire driving system can be implemented in digital form using configurable logic devices like a PLA or similar programmable devices.

BRIEF DESCRIPTION OF THE DRAWINGS

The various aspects and advantages of the invention will become even clearer through the following description of some important embodiments and by referring to the attached drawings, wherein.

DETAILED DESCRIPTION OF THE PREFERRED EMBODIMENTS

Figure 1:
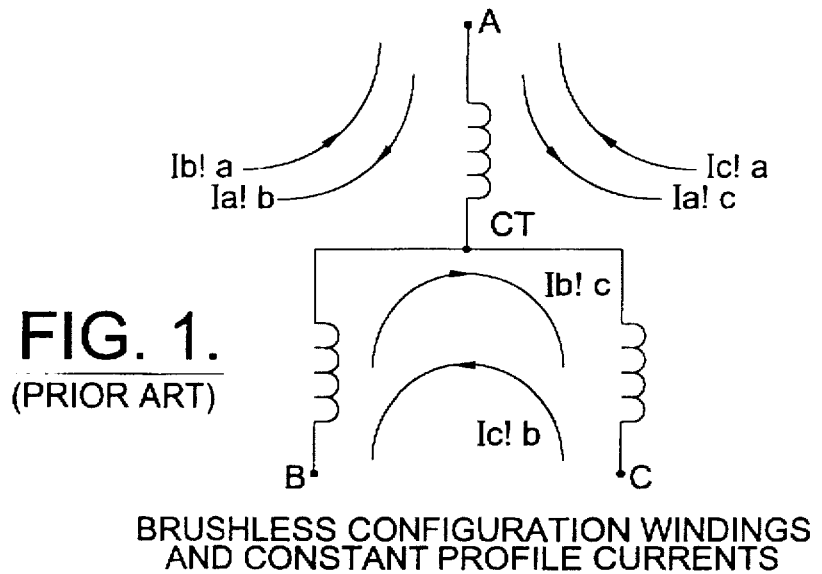
FIG. 1 shows the meaning of the notation as in the prior art and used in the present context.

FIG. 1 depicts the classical scheme of a DC motor having three phase windings connected in a star configuration. The standard notation is that of indicating each excitation phase by two capital letters, the first capital letter (for example A, B, C) defines the winding through which the current conventionally flows from the respective supply terminal towards the star center (CT) and the second capital letter, preceded by the sign (!), designates the winding through which the current, conventionally coming from the star center, flows towards the supply terminal of the relative winding. The currents scheme for the six different switching phases (A!B, A!C, B!C, B!A, C!A, C!B), referred to the case of a three winding motor is illustrated in FIG. 1.

These brushless motors are commonly driven by an integrated circuit whose output stage is represented by a multiphase full-wave bridge circuit, which in the case of a three-phase motor may employ six bipolar (BJT) or field effect (MOS) power transistors. The motor's current may be linearly controlled by a transconductance loop, as disclosed in FIG. 2, for the case of a current mode control. As an alternative, it is also possible to implement a voltage mode control. During a certain switching phase of the motor, the "sourcing" power transistor is forced into full conduction (that is to saturation in case of an MOS device), whereas the "sinking" power transistor operates as an element of transconductance, according to the scheme of FIG. 2, which refers to the use of power MOS devices.

Figure 2:
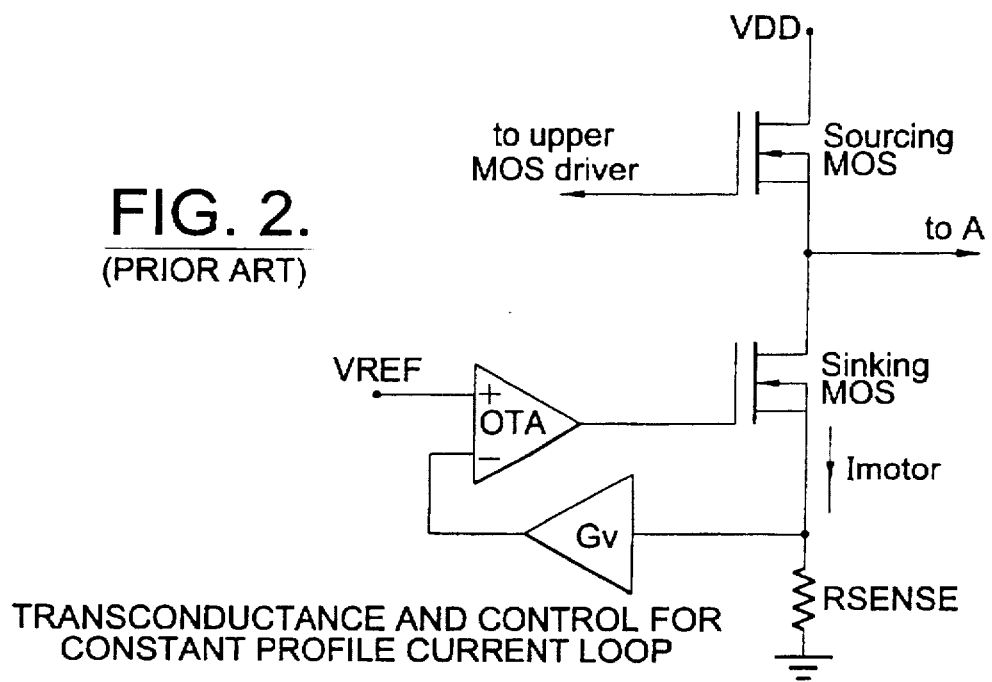
FIG. 2 is a prior art scheme of a transconuctance control loop of the current forced through a motor's winding.

With reference to FIG. 2, the motor's current may be expressed as follows: where Vref is the control voltage, generated by a phase-locked speed regulation loop (PLL), Gv is the voltage gain of the sensing amplifier while Rs is the current sensing resistor. In the prior art, the voltage Vref is set to a certain value by a dedicated phase locked regulating loop (PLL) to regulate the current absorbed by the motor and thus maintain a given rotational speed under varying load conditions. Of course, the regulation PLL loop acts upon the Vref value by varying its instantaneous value about its regulating value to compensate for instantaneous load-torque variations.

Figure 3A:
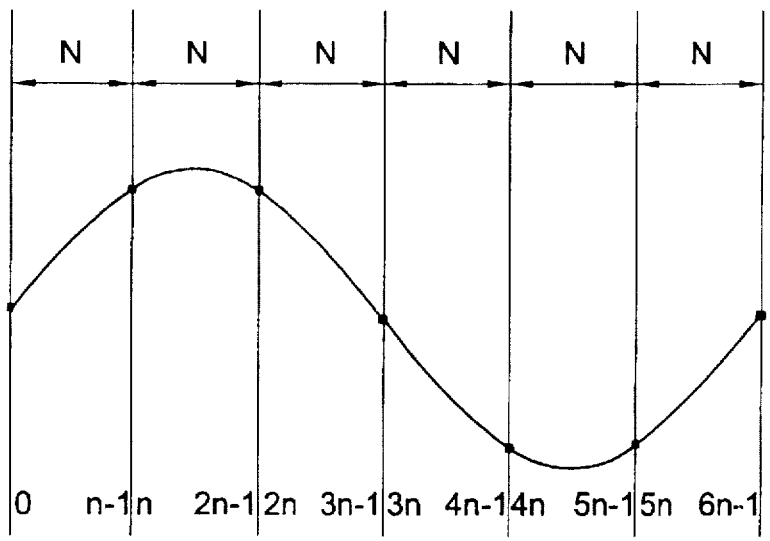
FIG. 3A shows a sinusoidal current profile divided in six sequences of N samples each as in the prior art.

In line with the technique described in the prior European Patent application No. 96830180.4 and also with the synchronization system disclosed in the prior European Patent application No 96830190.3, the contents of which are herein incorporated by way of reference, through the motor's windings a certain current or voltage periodic profile is forced through the succession of switching phases. The period of the driving signal profile for each winding is equivalent to the time taken by the rotor to complete an entire electric turn. This entire periodic profile is divided into the same number of sequences of N samples for each of the switching phases of the motor, when driven as illustrated in the diagram of FIG. 3A.

As described in the European Patent No 96830190.3, the system requires the generation of a synchronization pulse ZC (or RZC), congruent with the instantaneous position of the rotor and which is asserted at the instant of synchronization of the scanning of the sequence of samples. By defining Tc to represent the time interval between two consecutive assertions of the ZC pulse, each of the six sequences of N samples that made up the entire driving signal profile for winding must be scanned in an interval of time corresponding to the last measured value of the time interval Tc. In other words, the system must ideally force the $XN_{th}$ (x=1,6) in coincidence with the last instant of a Tc interval.

Figure 3B:
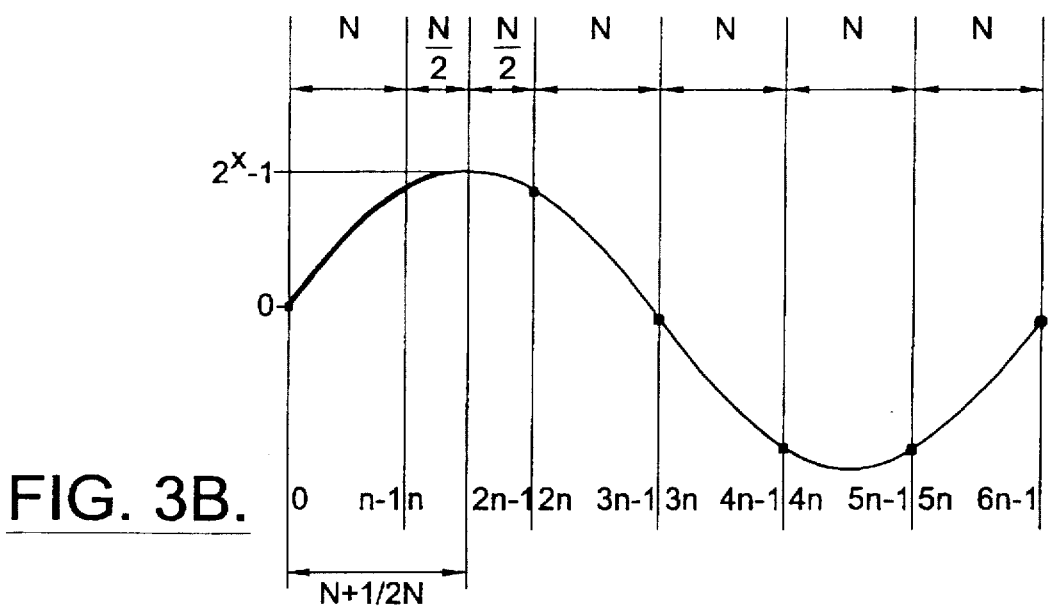
FIG. 3B depicts the sequences that are effectively stored in a nonvolatile manner in a digital memory of the system of the invention.

The system of the invention may utilize the same scheme of synchronization described in the patent application Ser. No. 96830190.3 or even an equivalent scheme, however rather than storing a complete series of sequences of N samples, it only stores one significant portion of the totality of said samples. According to a first embodiment, the system stores just a first quarter of the whole series of samples, that is, only the samples of the first sequence and those of a first half of the N samples belonging to the successive sequence, as shown in FIG. 3B. In practice, the system allows for storing the samples of the driving profile or waveform relative to the first 90 electric degrees of the whole profile (rotor's rotation).

The entirely digital system may be considered as comprising two main parts or portions. A first part defines the logic circuitry capable of reconstructing a whole driving profile from the N+1/2N permanently stored samples, as well as reconstructing the other two similar profiles, out-of-phase by 120 and 240 electric degrees, respectively, from the first profile, relative to the three phase windings of the motor shown in FIG. 1. The other functional part or portion, which may also be realized entirely in digital form, modulates the amplitude of the three reconstructed driving profiles as a function of the content of a dedicated register AMPCONTROL of K bits.

Figure 4:
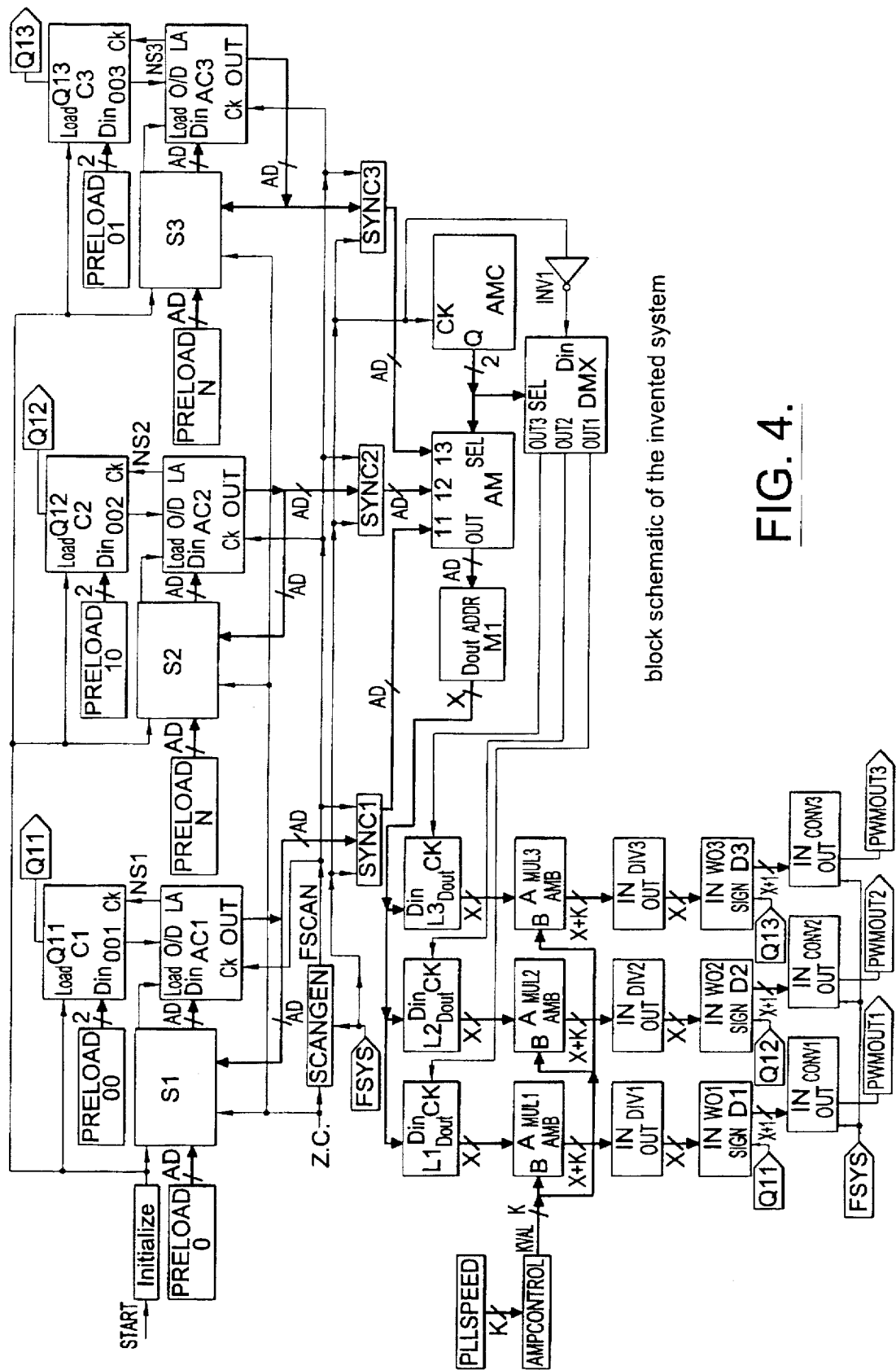
FIG. 4 shows a block diagram of the system of the invention.

As a whole, the block diagram of the system of the invention, according to this first embodiment, is shown in FIG. 4. The nonvolatile memory M1 contains the values relative to the digital samples of the first quadrant (from 0 to 90 electric degrees) of the pre-defined driving profile (as current or voltage samples), that is, the N samples of the first of the six sample sequences and the first half of the N samples of the second sequence of the sequences into which is divided the whole period of the driving profile. In other words, the memory M1 contains 3/2N samples.

On the assumption of digitizing each sample in the form of a word made up of an X number of bits, then, the permanent (nonvolatile) samples stored in the memory M1 will have a value between 0 and $2^x-1$, as shown in FIG. 3B. Because M1 must be capable of storing 3/2N samples, its address bus must then have a number of AD bits, where AD is the lowest integer number equal or greater than $LOG_2(3/2N)$.

Figure 5:
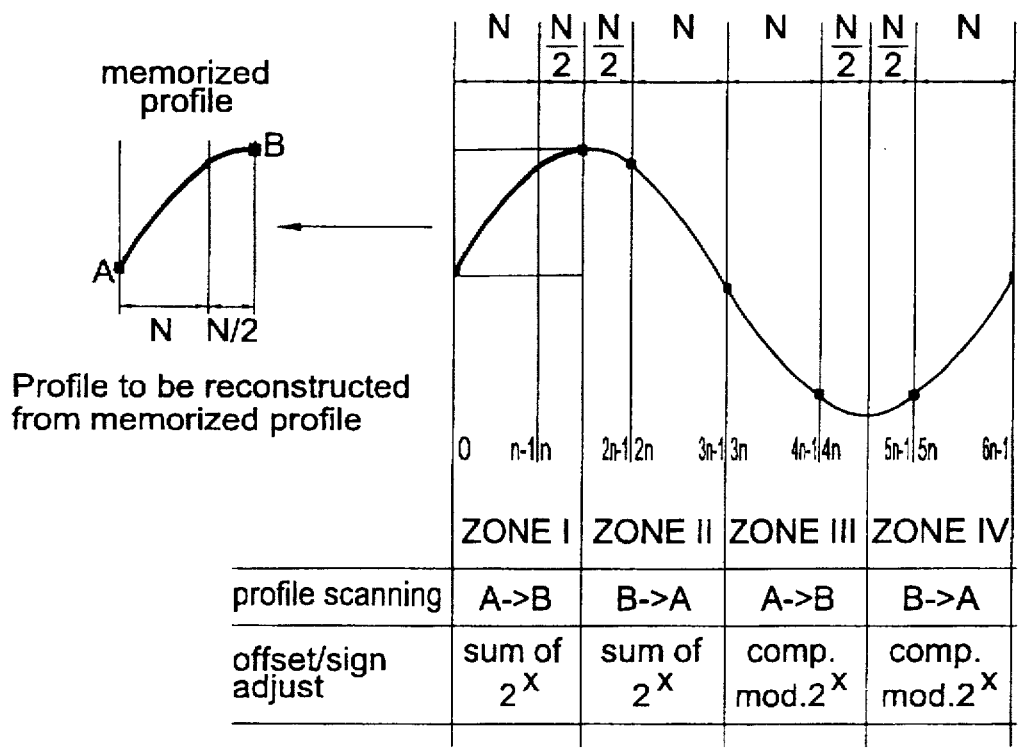
FIG. 5 shows the four zones (quadrants) of a whole driving periodic profile and the reconstruction scheme of the present invention.
Figure 6A:
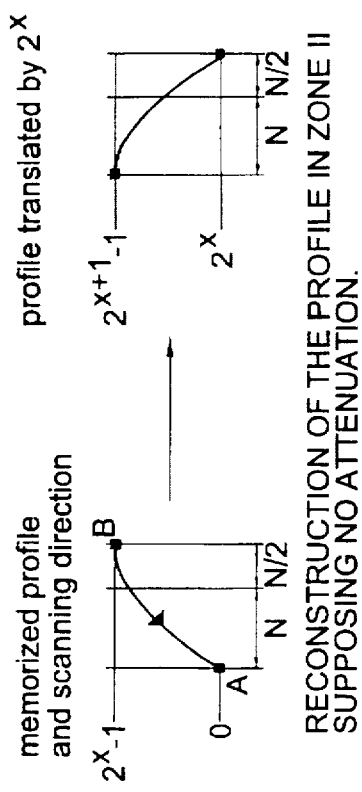
FIGS. 6A, 6B, 6C, 6D depict the reconstruction process, zone by zone, of the entire profile from the memorized sequences samples.

The reconstruction scheme of on entire profile from the stored quadrant is schematically shown in FIGS. 5 and 6A,B,C, and D. The whole pre-defined driving profile is divided into four zones or quadrants, respectively I, II, III, and IV and. According to an embodiment, only the quadrant I of the profile is sampled, digitized and stored in a nonvolatile manner. The remaining zones or quadrants of the profile are reconstructed every time by the system. To attain this, the system recognizes to which zone or quadrant the digital value of the sample read from the memory must be attributed to properly reconstruct the profile.

If the value to be read from the memory must be attributed to a sample of the quadrant I, then this is read and stored in the dedicated latch. The address of the memory is then incremented because in this zone I the profile or the sequence of stored digital values is scanned from left to right, that is, from a point A to point B, as depicted in FIG. 6A. Thereafter, the sample is modulated by the digital multiplier MULx (x=1,2,3), divided by $2^k$ and subsequently complemented by $2^x$ by the block WOx (x=1,2,3). In this way it assumes a full dynamic amplitude as permitted by the X+1 number of bits into which each sample of the three output sequences or profiles is digitized.

Figure 6B:
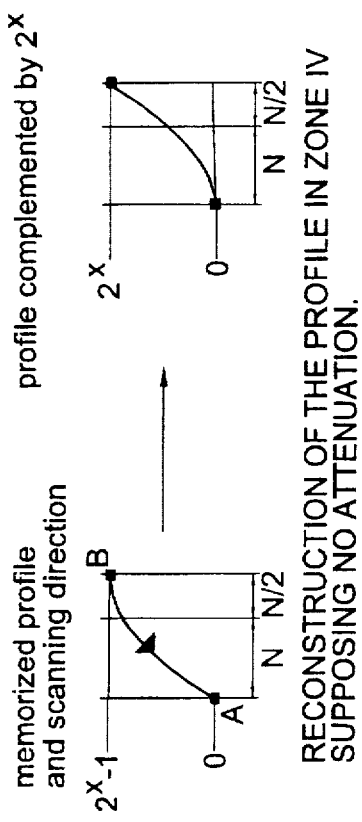

If the sample or digital value read from M1 must be attributed to the zone or quadrant II, after being stored in the dedicated latch, the address of the digital memory is decremented because in zone II the profile is scanned from right to left, that is, from point B point A, as shown in FIG. 6B. Also in this case the sample is modulated by the digital multiplier MULX (x=1,2,3), divided by $2^k$ and afterwards complemented by $2^x$ by the WOx (x=1,2,3) block, to assume a full dynamic amplitude, as permitted by the X+1 number of bits into which each sample of the three output sequences or profiles is digitized.

Figure 6C:
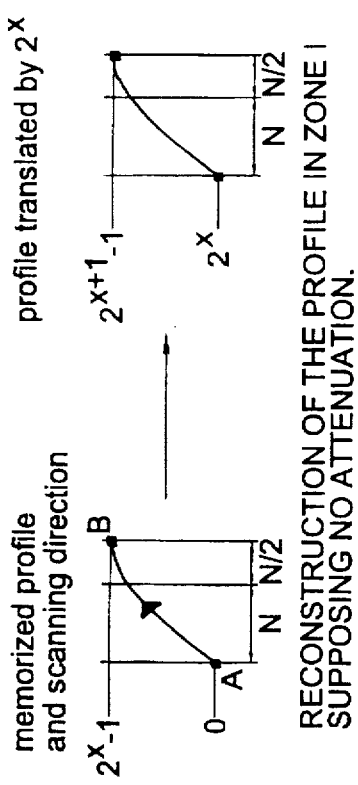

If attributed to zone III, the sample is read and stored into the dedicated latch and the address of the digital memory is incremented because in zone III the profile is again scanned from left to right, that is from point A to point B of FIG. 6C. The sample is thereafter modulated by the digital multiplier MULX (x=1,2,3), divided by $2^k$ and is then complemented by the module $2^x$ by the block WOx (x=1,2,3) to attain the full dynamic amplitude allowed by the X+1 number of bits into which each sample of the three output sequences is digitized.

Figure 6D:
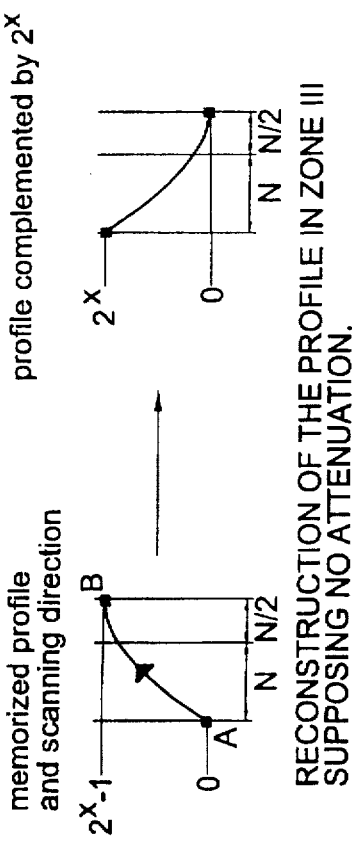

If the sample read from the memory belongs to zone IV, after being stored into the dedicated latch, the address of the digital memory is decremented because in zone IV the profile is scanned from right to left, that is from point B to point A of FIG. 6D. The sample is then modulated by the digital multiplier MULx (x=1,2,3) divided by the module $2^k$ and thereafter is complemented by $2^x$ by the block Wox (x=1, 2, 3) to attain the full dynamic of amplitude permitted by the X+1 number of bits into which each sample of the three output sequences is digitized.

Since the motor requires three similar driving signals out-of-phase by 120 electric degrees among each other, the system has three address counters of the up/down type AC1, AC2, and AC3, which point the correct datum in the common memory M1, whose addresses bus has a number AD of bits. The ACx (x=1,2,3) counters are synchronized by the clock signal FSCAN generated by the SCANGEN block which multiplies by a factor N the frequency of the synchronization signal ZC. In this way, each sequence of N samples fits within the time interval Tc (equivalent to the interval between two consecutive assertions of the synchronism pulse ZC).

Figure 7:
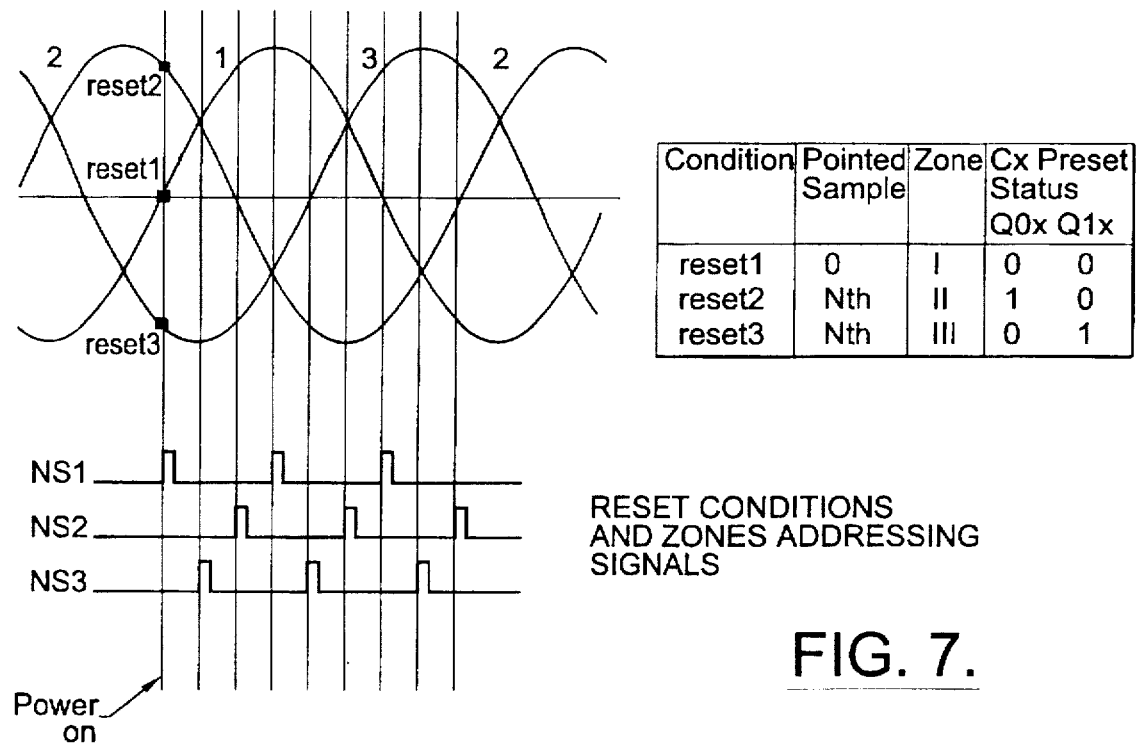
FIG. 7 illustrates the power-up and reset conditions of the counters that generate the addresses.

At the power-on instant, the three address generators are pre-set with the first three correct values (RESET1, RESET2, RESET3), out-of-phase by 120° from each other, as shown in FIG. 7. The first counter is pre-set to address the first sample of the entire series of samples, whereas the remaining two are pre-set as pointing the $N_{th}$ sample. The Sx blocks supervise the preleading of the addresses at power-on or resynchronization of the addresses with the ZC signal. These S1, S2, S3 blocks are described in details in the cited prior European patent application No. 96830190.3.

The state of the two bits counters C1, C2 and C3 defines one of the four zones or quadrants and by calling Q0x and Q1x the two output bits of the respective Cx(x=1,2,3), the following relationships may be established:

| Q0x | Q1x | Addressed zone |
|-----|-----|----------------|
| 0   | 0   | I              |
| 1   | 0   | II             |
| 0   | 1   | III            |
| 1   | 1   | IV             |

At power-on, the counters Cx (x=1,2,3) are pre-set in a proper state, as shown in FIG. 7, whereby C1 is forced to state I, C2 is forced to state II and C3 is forced to state III.

A new configuration of the Cx (x=1,2,3) counters is forced every 3/2N samples addressed and "buffered" by acting upon the NSx (x=1,2,3) signals originating from the respective address generators. When Q0x (x=1,2,3) is low, it forces the respective address generator to count upward, while forcing the same generator to count downward when Q0 is high. The Q1x signal forces the respective offsetting block of the Wox (x=1,2,3) waveform to add $2^x$ to the input datum, if Q1x is low, or to complement the input datum with the $2^x$ module, if Q1x is high. AM is an address multiplexer that, functioning collectively with the two bit counter, the module three block AMC, to the demultiplexer of 1-to-3 lines DMX and the three synchronization blocks SINCx (x=1,2,3), permits bufferring the subsequent data of the profile in the latches Lx (x=1,2,3).

The process of addressing through the multiplexer employs the fastest clock available, using for example the system's frequency FSYS. At each leading front of the system's clock signal FSYS, the AMC counter forces AM to address M1 on the proper datum and forces the DMX to address the appropriate "buffer". At each trailing front of the system's clock signal FSYS, the datum at the M1 output is stored in the so selected latch (buffer). The SINCx (x=1,2,3) blocks prevent a simultaneous updating of the AC1, AC2 and AC3 counters upon a reading of the AM block.

Figure 8:
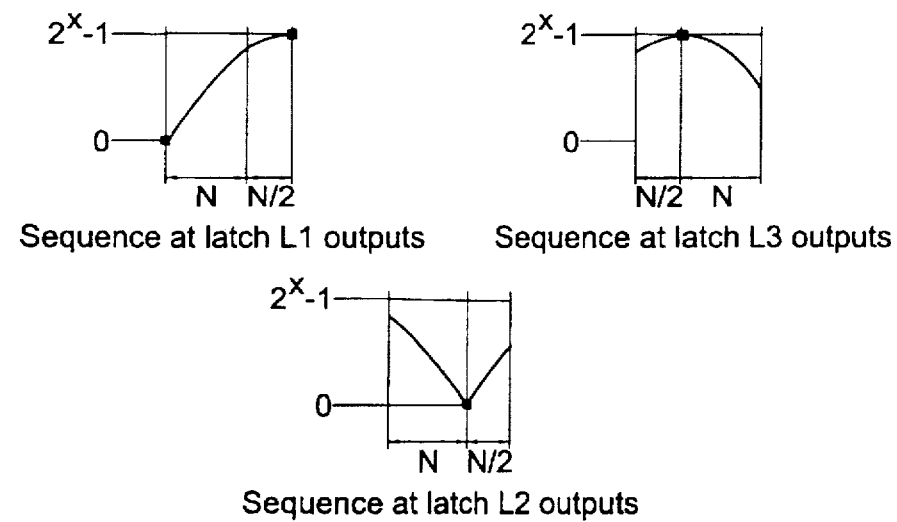
FIG. 8 illustrates the switching sequences of the Lx (x=1,2,3) latches.

The profiles appearing at the output of the three latches Lx (x=1,2,3) for the first 3/2N samples are shown in FIGS. 8A, 8B and 8C, respectively. Thereafter these profiles are then amplitude modulated and employed in reconstructing the actual drive signals of the motor's windings.

The profiles at the output of the latches have a normalized amplitude of $2^x-1$.

The three multiplier blocks MULx (x=1,2,3) have the task of digitally multiplying the data present at the outputs of the respective Lx latches by an updatable value contained in the K-bit register AMPCONTROL. The multiplier should have an output capacity capable of supporting the required number of bits to express the result of the multiplication: for instance, if X=7 and k=8, the multiplier should have a digital output of at least 15 bits. The KVAL value in the AMPCONTROL register modulates the amplitude of the reconstructed drive profiles and this value may be continuously updated through a control routine of the motor's speed performed by the PLLSPEED block.

The datum at the multiplier output is divided by $2^k$, where K is the number of bits of the AMPCONTROL register, because the output samples are correlated to the input samples by way of the following equations:

x=1,2,3 if K=8, then x=1,2,3 where INx are the input samples of the multiplier and OUTx are the output data of the multiplier after amplitude modulation. Finally, the sample value is translated by the WOx (x=1,2,3) block to properly reconstruct the whole profile with the maximum possible amplitude dynamics.

The state signal Q11, Q12 and Q13 originating from the state counters C1, C2 and C3 are input to the WOx (x=1,2,3) blocks. The following table illustrates the action of the WOx blocks on the input signals.

| Q1x (x = 1,2,3) | effect of the WOx block |
|---|---|
| 0 | adds $2^x$ to the input datum |
| 1 | complements the input datum with the module $2_x$ |

The Dx (x=1,2,3) data of the respective WOx blocks output define the properly reconstructed and modulated sequences of the predefined current or voltage profile.

The CONVx blocks (x=1,2,3) convert the Dx (x=1,2,3) sequences of input samples of X+1 bits into three PWM signals. The CONVx blocks carry out the following conversion (assuming X+1=8):

| INPUT BYTE | PWM % OUTPUT |
|---|---|
| 0 | 0 |
| 127 | 50 |
| 255 | 100 |

Figure 9:
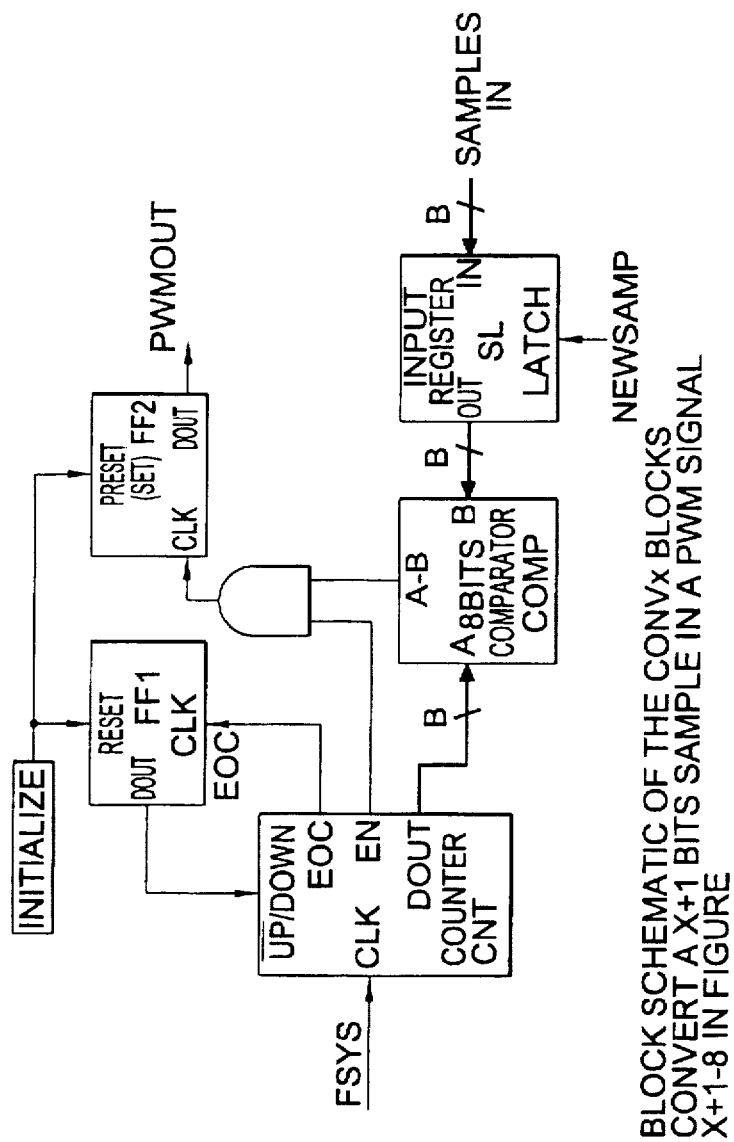
FIGS. 9 and 10 respectively show the block diagram and the I/O signals of the PWM CONVx (x=1,2,3) converters.

An embodiment of one of these converting blocks for X+1=8 is shown in FIG. 9.

The INPUT sample is transferred through the synchronizing latch SL to the B input of the 8-bit comparator (COMP) whereas at the A input of the same is fed the output of the CNT counter synchronized with the clock FSYS. PWMOUT represents the alternating output of the FF2 latch which may be either set or reset (depending on whether a direct PWM signal or an inverted signal is required) at power-on commanded by the INITIALIZE block.

The "Toggle" FF1 latch, at power-on, forces the CNT counter to count up. When the counter CNT reaches a value equal to that at the input B of COMP, the latter sets the signal A=B which switches FF2 so that PWMOUT goes high (if the value at the input B is equal to A when EOC is reached, then FF2 will not switch because the EN signal of CNT is forced low). When the counter CNT reaches the top counting limit, it switches FF1 via EOC, thus forcing the CNT counter to count down. When the counter CNT reaches again the value equal to that present at the input B of COMP, the latter sets again the signal A=B, the latch FF2 is reset and thus PWMOUT goes low again. When the counter CNT reaches the bottom counting limit, the latch FF1 switches and forces CNT to count up again and the process is repeated.

Therefore, the frequency of the PWMOUT signal is given by:

$$Fpwmount = \frac{FSY}{2^{X+2}}$$

Figure 10:
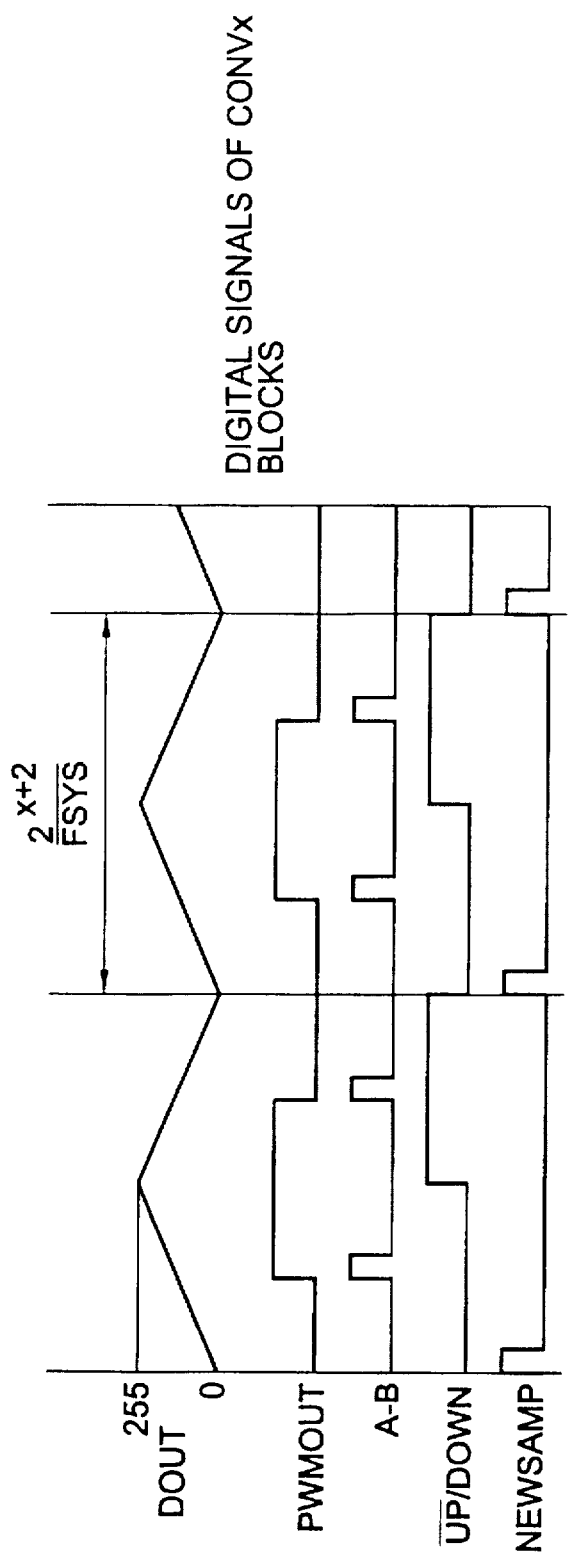

FIG. 10 depicts the signals involved in the above described data/PWM conversion for the case of X+1=8. The PWMOUTx (x=1,2,3) signals may directly drive three half-bridge power stages, functioning in a PWM mode or may be filtered through a simple RC network to reconstruct three analog drive profiles.

Figure 11:
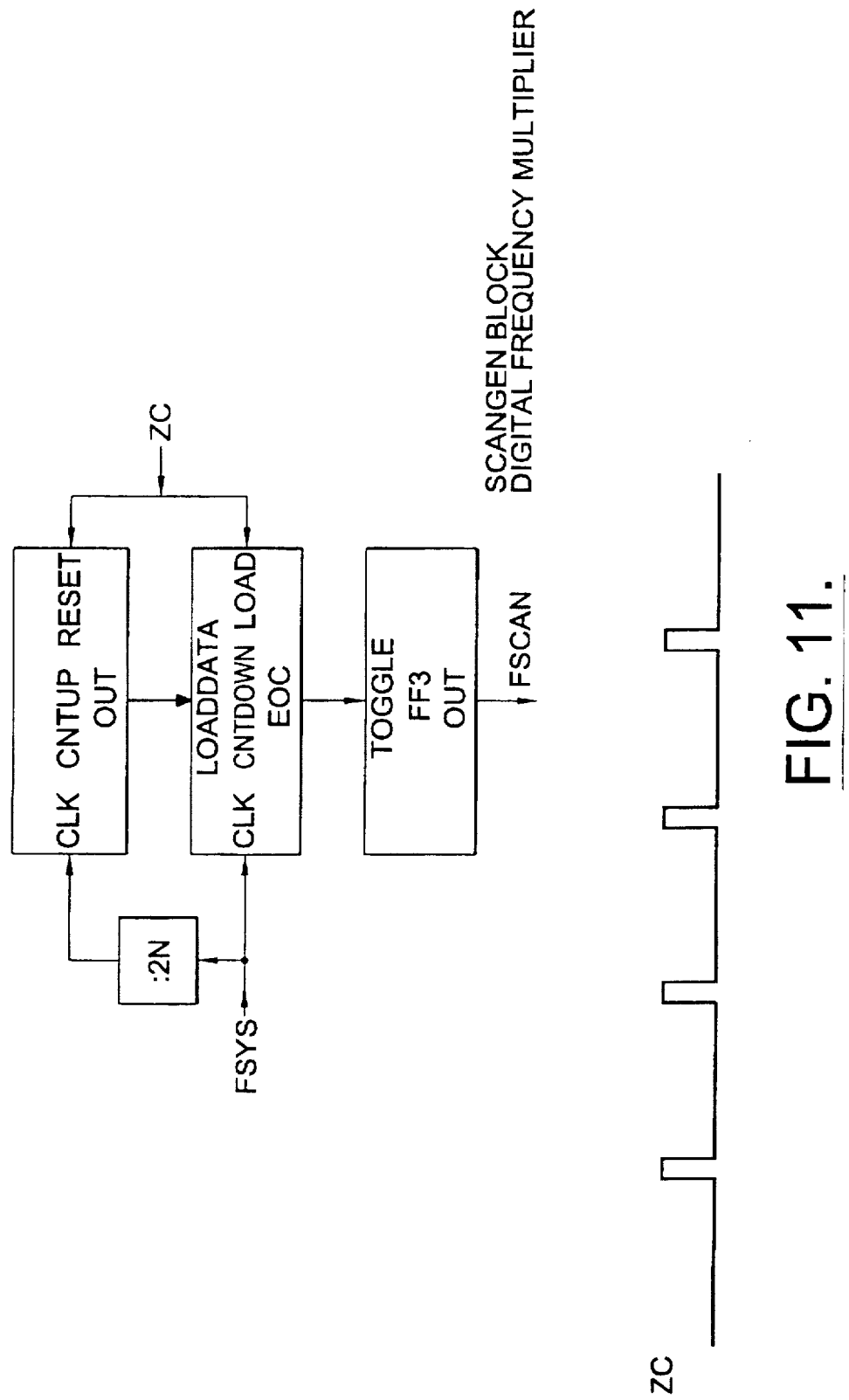
FIG. 11 shows a scheme of the SCANGEN block used as a digital frequency multiplier.

FIG. 11 shows an embodiment of the SCANGEN block representing a digital PLL block used by the system to generate the FSCAN frequency that times the address generators ACx (x=1,2,3). As stated above, FSCAN must be N times higher than the frequency of the synchronism signal ZC. The assertion of the synchronism signal ZC resets the counter CNTUP which is timed with a frequency equal to FSYS/2N and loads the CNTDOWN counter with the last value present at the outputs of CNTUP before it is reset. Because the CNTDOWN is directly timed by FSYS and because the FF3 latch is switched at each EOC of the CNTDOWN counter, the outcome is that the frequency of the FSCAN signal at the FF3 output is exactly N times the frequency of the ZC signal.

Figure 12:
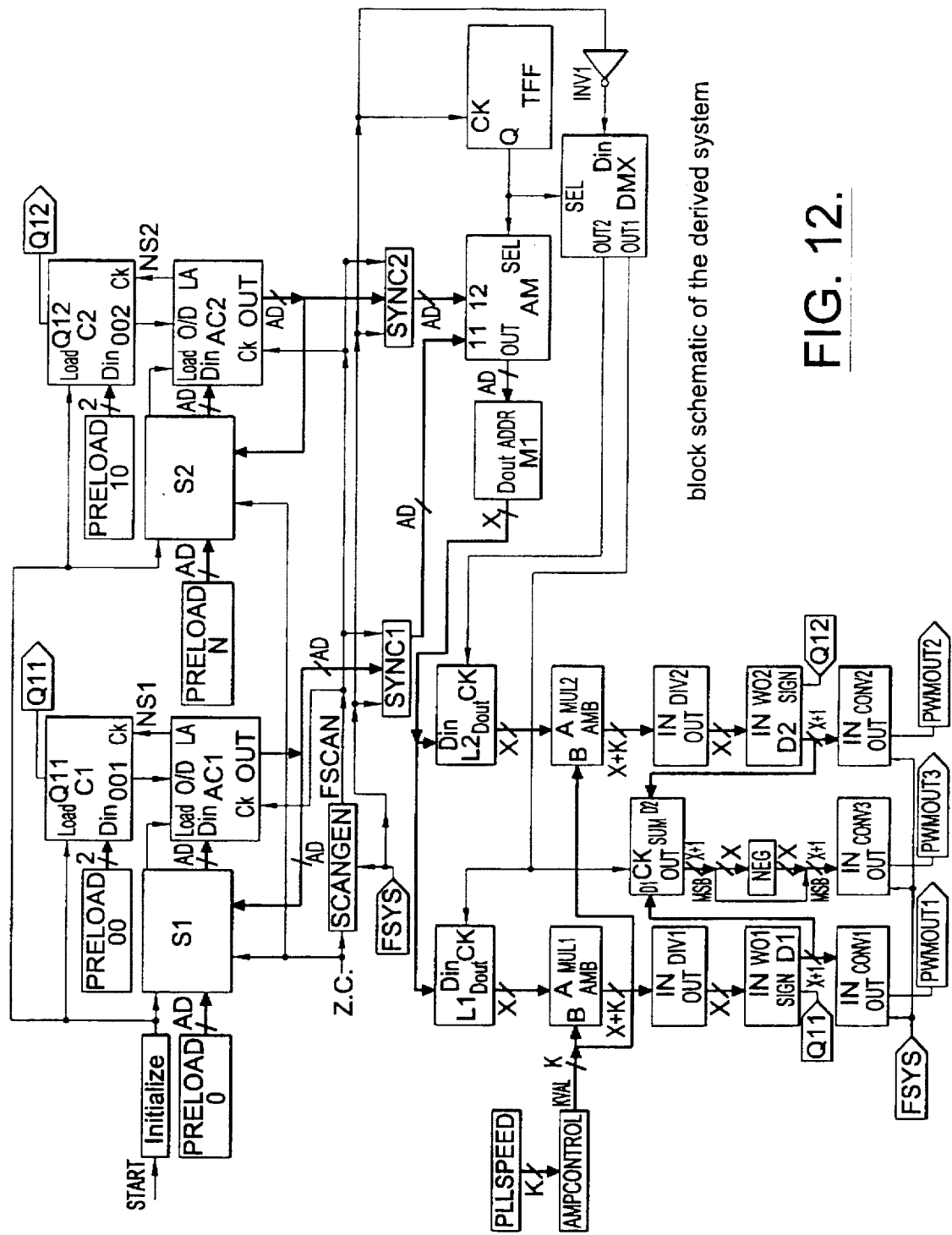
FIG. 12 shows a block diagram of an alternative embodiment of the system of the invention.

FIG. 12 shows another embodiment of the system in which the third profile is reconstructed as the sum of the remaining two profiles. In this instance all the blocks of the scheme of FIG. 4 relating to the third profile (x=3) may be eliminated whereas the SUM and NEG blocks must be added to reconstruct the third profile from the other two. The SUM block adds the X+1 bit data to the outputs of the WO1 and WO2 blocks and the corresponding results are truncated at the least significative X+1 bits. Of course the sum is synchronized so to be enabled when the two input data are stable.

The NEG block inverts the least significative X bits of the sample at the output of the SUM blocks and the resultant signals are thereafter loaded into the CONV3 block. The most significative bit (MSB) is not inverted and is loaded directly into the CONV3 block as MSB. According to this embodiment, the DMX block is a demultiplexer of 1-to-2 lines while the AMC block may be replaced by a simple TFF latch. According to an alternative embodiment of the invention it is possible to store in M1 only N+1 samples, equivalent to just one sample more than those pertaining to the first 60 electric degrees of a whole profile. By observing the scheme of FIG. 4, at each instant the sample stored in the M1 portion between N+1 and 3/2N is read.

As already described and illustrated in FIG. 12, given two profiles it is possible to reconstruct the third by means of simple operations in a way that is feasible to obtain a wave profile derivable from the set of samples N+1 . . . 3/2N thanks to the fact that the other two waves in any case exploit samples stored in the cells 0 to N of M1. Considering the reset situation of FIG. 7 and referring to the scheme of FIG. 4, it may be noted that in the first 60 degree, the profiles 1 and 2 point the memory in the set 0 . . . N so that the third profile 3 must be reconstructed from the first two. 60 degrees after the initial reset signal, the profile 1 is pointing to the N−1 cell in the memory, the profile 2 will be pointing the cell 1 of the memory, whereas the third profile will be pointing the N+1 sample, with the substantial difference that the profile 1 is about to exit the zone 0 . . . N while the profile 3 will be entering it. Thus it will become necessary to reconstruct the profile 1 by exploiting the data of the other profiles 2 and 3.

After further 60 degrees, the profile 1 will be pointing the N+1 cell of the memory, the profile 2 will be pointing the N−1 cell of the memory while the third profile will be pointing sample 1, the difference being that now the profile 2 is about to exit the zone 0 . . . N while the profile 1 is about to enter it.

Thus it will become necessary to reconstruct the profile 2 exploiting the data of the other profiles 1 an 3.

The following table illustrates the method for an entire electric revolution from the moment of the initial reset.

| DEGREES: | 0...60 | 60...120 | 120...180 | 180...240 | 240...300 | 300...360 |
|---|---|---|---|---|---|---|
| PROFILE BEING RECONSTRUCTED: | 3 | 1 | 2 | 3 | 1 | 2 |

Figure 13:
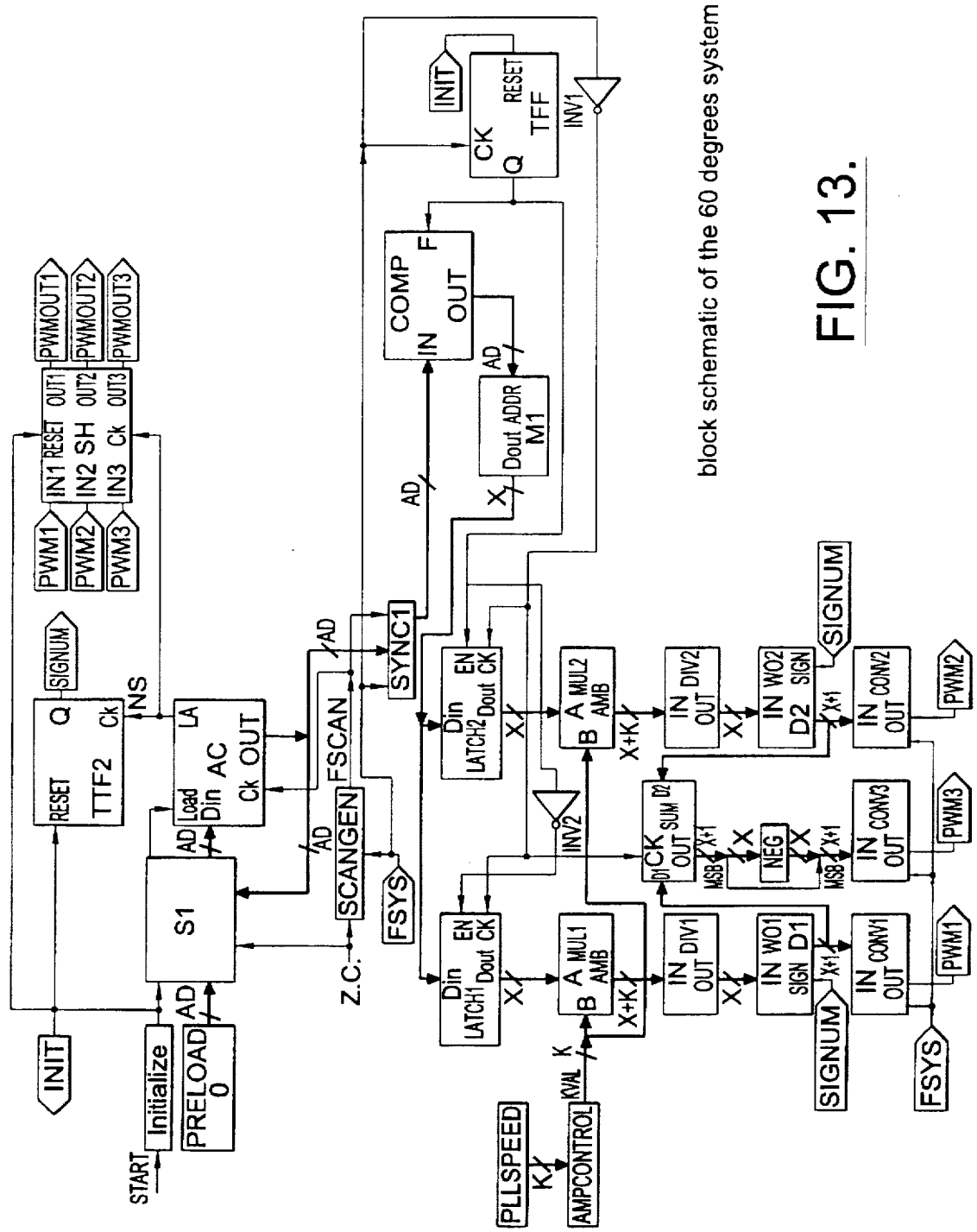
FIG. 13 is a block diagram of a further alternative embodiment of the system of the invention.

By referring to FIG. 13, the final stages that comprise the SUM, NEG, MULx, DIVx, WOx (x=1,2) and CONVx (x=1,2,3) block remain unchanged as compared to FIG. 12. The modifications concern only the other blocks and in particular the way of accessing M1 has been modified by the addition of the SH block. The block SH is synchronized at each end of sequence and, by drawing the PWMx (x=1,2,3) signals from the output of the respective CONVx stages, it distributes them to the relative motor's winding through the PWMOUTx signals, according to the table shown above and more particularly, according to the following scheme:

| DEGREES: | 0...60 | 60...120 | 120...180 | 180...240 | 240...300 | 300...360 |
|---|---|---|---|---|---|---|
| PWMOUT1: | PWM1 | PWM3 | PWM2 | PWM1 | PWM3 | PWM2 |
| PWMOUT2: | PWM2 | PWM1 | PWM3 | PWM2 | PWM1 | PWM3 |
| PWMOUT3: | PWM3 | PWM2 | PWM1 | PWM3 | PWM2 | PWM1 |

With regard to the addressing of the memory, AD must be the least integer greater or equal to log2(N+1) whereas the address counter (AC) may simply be an increment N-module counter. Indeed, the countdown from N to 0 is only necessary to obtain PWM2 and may be replaced by a (COMP) block capable of complementing to N the value coming from AC.

The memory is alternatively addressed with the addresses relative to the PWM1 and PWM2 signals (synchronism managed by TFF); in particular COMP addresses the memory with the value coming from AC (properly synchronized by SYNC1), if at its F input the value is 0, otherwise the memory will be addressed by the value from AC, complemented to N. By doing so, in the LATCHx (x=1,2) buffers is stored the appropriate value because they are alternatively enabled by the signal coming from TFF. In particular, the LATCH 2 is directly enabled by the TFF output while the LATCH1 is enabled by the inverted signal of this output signal through INV2.

A further modification of the scheme of FIG. 12, includes utilizing only one TFF2 rather than C1 and C2 to determine the value to be introduced at the SIGN input of the WOx (x=1,2) blocks because it is sufficient to alternatively force the signals 0 and 1 at the end of each scanning cycle of the memory. Indeed Q1x (x=1,2,3) of FIG. 4 assume the following values:

relative to the "original" profiles assume the value 0, from 0 to 60 degrees, the value 1, from 60 to 120 and so forth alternately in the successive zones.

We claim:

1. A method of driving a multiphase brushless motor of a type comprising a plurality of phase windings and a rotor, the method comprising the steps of:

defining a current or voltage profile for each phase winding of the motor so that a sum of instantaneous values of the profiles can be constant;

forcing a current or a voltage according to the profiles through the corresponding phase windings of the motor synchronously with a signal representative of a position of the rotor by reading digitized samples of the profiles stored in a nonvolatile memory;

storing in the nonvolatile memory only a first complete sequence and at least a first sample of a successive sequence of a number of sequences, each on N samples, equal to a number of switching phases of the motor, in which is divided a complete periodic cycle of the current or voltage profile, each stored sample being pointed by an address generator during a reading phase of the nonvolatile memory; and reconstructing an entire cycle of the current or voltage profile for each winding of the motor from the limited number of samples stored in the nonvolatile memory.

2. The method according to claim 1, further comprising the steps of:

defining, by subdivision of the current or voltage profile, four different zones of 90 electric degrees, into one of which the profile is defined by the entire sequence and by a successive half-sequence of stored samples; and the profile in the other three zones being reconstructed by scanning the stored samples of the first sequence and of the half-sequence according to a scanning order and direction of scanning as a function of the current one of the profiles under reconstruction.

| DEGREES: | 0...60 | 60...120 | 120...180 | 180...240 | 240...300 | 300...360 |
|---|---|---|---|---|---|---|
| Q11: | 0 | 0 | 0 | 1 | 1 | 1 |
| Q12: | 0 | 1 | 1 | 1 | 0 | 0 |
| Q13: | 1 | 1 | 0 | 0 | 0 | 0 |
| RECONSTRUCTED PROFILE: | 3 | 1 | 2 | 3 | 1 | 2 |

From these analyses can be gathered that in each zone, the Q1x relative to the reconstructed profile assumes a value different from the other two and, in particular, that the Qx 3. The method according to claim 1, further comprising the steps of:

defining, by subdivision of the profile, six different zones, each of 60 electric degrees, into one of which the profile is defined by the entire sequence of samples;

storing in a nonvolatile manner in the nonvolatile memory only the N samples a first complete sequence plus the first sample of the following sequence of the next 60 degrees; and reconstructing the entire profile by scanning the N samples of the first sequence and the first sample of the following sequence, according to a scanning order and direction as a function of a current zone of the profile under reconstruction.

4. The method according to claim 2, wherein each sample is stored and read from the memory in the form of a word of an X number of bits.

5. The method according to claim 4, wherein in the quarter of a period of the current or voltage profile is stored in the memory with an amplitude dynamic equivalent to a half of the dynamic of $2^{x+1}$ allowed by the final stage of the driving system; the minimum sample value being stored as zero and the maximum value of the samples being stored as $2^x-1$.

6. The method according to claim 1, wherein the memory is read alternatively with an address whose value increases from zero to N−1 and with its complement to N.

7. The method according to claim 1, wherein the motor has three phase windings connected in a star configuration and defining six different switching phases, and further comprising the step of obtaining three identical reconstructed profiles out-of-phase by 120° from one another by alternating the reconstruction of the third, of the first and of the second profile respectively through the first and second profile, the second and third profile and the first and third profile.

8. A method of driving a multiphase brushless motor of a type comprising three phase windings connected in a star configuration and defining six different switching phases and a rotor, the method comprising the steps of:

defining a current or voltage profile for each phase winding of the motor so that a sum of instantaneous values of the profiles can be constant;

forcing a current or a voltage according to the profiles through the corresponding phase windings of the motor synchronously with a signal representative of a position of the rotor by reading digitized samples of the profiles stored in a nonvolatile memory;

storing in the nonvolatile memory only a first complete sequence and at least a first sample of a successive sequence of a number of sequences, each on N samples, equal to a number of switching phases of the motor, in which is divided a complete periodic cycle of the current or voltage profile, each stored sample being pointed by an address generator during a reading phase of the nonvolatile memory;

reconstructing an entire cycle of the current or voltage profile for each winding of the motor from the limited number of samples stored in the nonvolatile memory; and obtaining three identical reconstructed profiles out-of-phase by 120° from one another by alternating the reconstruction of the third, of the first and of the second profile respectively through the first and second profile, the second and third profile and the first and third profile.

9. The method according to claim 8, further comprising the steps of:

defining, by subdivision of the current or voltage profile, four different zones of 90 electric degrees, into one of which the profile is defined by the entire sequence and by a successive half-sequence of stored samples; and the profile in the other three zones being reconstructed by scanning the stored samples of the first sequence and of the half-sequence according to a scanning order and direction of scanning as a function of the current one of the profiles under reconstruction.

10. The method according to claim 8, further comprising the steps of:

defining, by subdivision of the profile, six different zones, each of 60 electric degrees, into one of which the profile is defined by the entire sequence of samples;

storing in a nonvolatile manner in the nonvolatile memory only the N samples a first complete sequence plus the first sample of the following sequence of the next 60 degrees; and reconstructing the entire profile by scanning the N samples of the first sequence and the first sample of the following sequence, according to a scanning order and direction as a function of a current zone of the profile under reconstruction.

11. The method according to claim 9, wherein each sample is stored and read from the memory in the form of a word of an X number of bits.

12. The method according to claim 11, wherein in the quarter of a period of the current or voltage profile is stored in the memory with an amplitude dynamic equivalent to a half of the dynamic of $2^{x+1}$ allowed by the final stage of the driving system; the minimum sample value being stored as zero and the maximum value of the samples being stored as $2^x-1$.

13. The method according to claim 8, wherein the memory is read alternatively with an address whose value increases from zero to N−1 and with its complement to N.

14. A driving system for a multiphase brushless motor of a type comprising a plurality of phase windings and a rotor, said driving system comprising:

a plurality of driving power stages of as many phase windings of the motor;

a nonvolatile memory for storing a pre-defined driving current or voltage profile for the phase windings;

a plurality of digital/analog converters for converting the digital value of each sample into which is digitized a respective current profile in an analog driving signal;

means for synchronizing the conversion of the samples read from the nonvolatile storing means with a signal representative of a position of the rotor and wherein only a first sequence of samples and at least a first sample of a successive sequence of samples of a number of sequences, each of N samples, equal to the number of switching phases of the motor, into which is divided a complete periodic cycle of the driving current or voltage profile are stored in the nonvolatile storing means;

pointing means for pointing as a function of an address value for an individual sample belonging to the complete sequence during a reading phase of the nonvolatile memory; and logic circuit means for reconstructing a first entire cycle and of similar cycles, out-of-phase from each other, of the driving current or voltage profile, from the stored samples.

15. The system according to claim 14, wherein the profile is divided into four different zones, each of 90 electric degrees, and only the N samples of a first complete sequence corresponding to samples of the first 60 electric degrees and the samples of a first half of the following sequence of samples are stored in the nonvolatile memory.

16. The system according to claim 14, wherein the profile is subdivided into six different zones, each of 60 electric degrees, and only the N samples of a first complete sequence and the first sample of the following sequence are stored in the nonvolatile storing means.

* * * * *

UNITED STATES PATENT AND TRADEMARK OFFICE
CERTIFICATE OF CORRECTION

Page 1 of 2

PATENT NO. : 5,793,180
DATED : August 11, 1998
INVENTOR(S) : Giuseppe Maiocchi and Marco Viti It is certified that error appears in the above-identified patent and that said Letters Patent is hereby corrected as shown below:

On the title page, item:

[30] Foreign Application Data   Strike: " 96830295 "

Insert: -- 96830295.0 --

Column 5, Line 22   Strike: " MULX "

Insert: -- MULx --

Column 6, Line 38   Strike: " 3/2N "

Insert: -- 3/2 N --

UNITED STATES PATENT AND TRADEMARK OFFICE
CERTIFICATE OF CORRECTION

PATENT NO. : 5,793,180
DATED : August 11, 1998
INVENTOR(S) : Giuseppe Maiocchi and Marco Viti It is certified that error appears in the above-identified patent and that said Letters Patent is hereby corrected as shown below:

Column 9, Lines 54 - 64

Strike:

| DEGREES: | 0...60 | 60...120 | 120...180 | 180...240 | 240...300 | 300...360 |
|---|---|---|---|---|---|---|
| Q11: | 0 | 0 | 0 | 1 | 1 | 1 |
| Q12: | 0 | 1 | 1 | 1 | 0 | 0 |
| Q13: | 1 | 1 | 0 | 0 | 0 | 0 |
| RECONSTRUCTED PROFILE: | 3 | 1 | 2 | 3 | 1 | 2 |

Insert:

| DEGREES: | 0...60 | 60...120 | 120...180 | 180...240 | 240...300 | 300...360 |
|---|---|---|---|---|---|---|
| Q11: | 0 | 0 | 0 | 1 | 1 | 1 |
| Q12: | 0 | 1 | 1 | 1 | 0 | 0 |
| Q13: | 1 | 1 | 0 | 0 | 0 | 1 |
| RECONSTRUCTED PROFILE: | 3 | 1 | 2 | 3 | 1 | 2 |

Signed and Sealed this

Twenty-sixth Day of January, 1999

Attest:

Attesting Officer

*Acting Commissioner of Patents and Trademarks*